United States Patent
Kuehne et al.

(10) Patent No.: US 9,927,316 B2
(45) Date of Patent: Mar. 27, 2018

(54) MEMS CHIP, MEASURING ELEMENT AND PRESSURE SENSOR FOR MEASURING A PRESSURE

(71) Applicant: KISTLER HOLDING AG, Winterthur (CH)

(72) Inventors: Stephane Kuehne, Zurich (CH); Claudio Cavalloni, Regensdorf (CH); Andreas Goehlich, Rheurdt (DE)

(73) Assignee: FRAUNHOFER-GESELLSCHAFT ZUR FOERDERUNG DER ANGEWANDTEN FORSCHUNT E.V., Munich (DE)

( * ) Notice: Subject to any disclaimer, the term of this patent is extended or adjusted under 35 U.S.C. 154(b) by 29 days.

(21) Appl. No.: 15/024,482

(22) PCT Filed: Oct. 2, 2014

(86) PCT No.: PCT/CH2014/000142
§ 371 (c)(1),
(2) Date: Mar. 24, 2016

(87) PCT Pub. No.: WO2015/048916
PCT Pub. Date: Apr. 9, 2015

(65) Prior Publication Data
US 2016/0231189 A1    Aug. 11, 2016

(30) Foreign Application Priority Data
Oct. 3, 2013  (CH) ........................ 1699/13

(51) Int. Cl.
*G01L 9/00*  (2006.01)
*G01L 19/00*  (2006.01)
*G01L 19/14*  (2006.01)
*G01L 19/06*  (2006.01)

(52) U.S. Cl.
CPC ............ *G01L 19/147* (2013.01); *G01L 9/005* (2013.01); *G01L 9/0045* (2013.01); *G01L 9/0054* (2013.01); *G01L 19/0627* (2013.01)

(58) Field of Classification Search
CPC ......... G01L 9/00; G01L 9/0045; G01L 9/005; G01L 9/0054; G01L 19/00; G01L 19/0627; G01L 19/14; G01L 19/147
See application file for complete search history.

(56) References Cited

U.S. PATENT DOCUMENTS 4,901,731 A * 2/1990 Millar .................. A61B 5/0215
600/486
6,626,044 B1 * 9/2003 Haji-Sheikh ........ G01L 19/0654
361/283.4
(Continued)

FOREIGN PATENT DOCUMENTS

EP    1780525 A1 *  5/2007  .......... G01L 9/0073
EP    2413122 A1 *  2/2012  .......... G01L 9/0075
(Continued)

OTHER PUBLICATIONS

Birkelund K et al: "High-pressure silicon sensor with low-cost packaging", Sensors and Actuators A, Elsevier Sequoia S.A., Lausanne, CH., vol. 92, No. 1-3, Aug. 1, 2001 (Aug. 1, 2001), pp. 16-22, XP004274019 ISSN: 09244247, DOI: 10.1016/S0924-4247(01)00534-9.
(Continued)

*Primary Examiner* — Nguyen Ha
(74) *Attorney, Agent, or Firm* — Dority & Manning, P.A.

(57) ABSTRACT

A micro-electro-mechanical system (MEMS) chip for measuring a pressure in a pressure space includes a MEMS substrate having a measuring region, a contact-making region connected to the measuring region via lines and having contacts, and a bushing region disposed between the measuring region and the contact-making region. The
(Continued)

MEMS substrate defines a cavity formed as a blind hole that defines an opening through one side of the MEMS substrate, the bottom of the blind hole forming a membrane. A measuring bridge includes piezoresistive elements disposed on that side of the membrane which faces away from the cavity's opening. A carrier substrate is disposed over the cavity's opening and bonded to the MEMS substrate in a two-dimensional manner to form a rod, with the result that the carrier substrate forms a bottom wall of the cavity spaced apart from the membrane.

21 Claims, 4 Drawing Sheets

(56) References Cited

U.S. PATENT DOCUMENTS

| | | | | |
|---|---|---|---|---|
| 7,246,525 | B2* | 7/2007 | Birkelund | G01L 9/0054 73/716 |
| 2004/0182165 | A1* | 9/2004 | Miyashita | G01L 9/0042 73/718 |
| 2010/0073123 | A1* | 3/2010 | Craddock | G01L 19/0069 338/42 |
| 2011/0309458 | A1 | 12/2011 | Gamage | |
| 2013/0042694 | A1* | 2/2013 | Ned | G01L 9/0048 73/727 |
| 2015/0315016 | A1* | 11/2015 | Yoneoka | B81C 1/00269 438/51 |

FOREIGN PATENT DOCUMENTS

| | | |
|---|---|---|
| WO | WO 89/10089 A1 | 11/1989 |
| WO | WO 02/29365 A2 | 4/2002 |
| WO | WO 2004/081510 A1 | 9/2004 |

OTHER PUBLICATIONS

International Search Report dated Jan. 1, 2015.

* cited by examiner

MEMS CHIP, MEASURING ELEMENT AND PRESSURE SENSOR FOR MEASURING A PRESSURE

CROSS-REFERENCE TO RELATED APPLICATIONS

This application claims priority to International Application Serial No. PCT/CH2014/000142, filed Oct. 2, 2014, which claims priority to Swiss Application No. 1699/13, filed Oct. 3, 2013. International Application Serial No. PCT/CH2014/000142 is hereby incorporated herein in its entirety for all purposes by this reference.

FIELD OF THE INVENTION

The present invention relates to a micro-electro-mechanical system chip (MEMS chip) for measuring a pressure in a pressure space, comprising a MEMS substrate and a carrier substrate, which are bonded to one another in a two-dimensional manner along their longitudinal axis A, wherein the MEMS chip has a measuring region with electromechanical measuring means, and has a contact-making region with contacts connected via conductors with the region to be measured. The MEMS chip is configured in the form of a rod, and the measuring region and the contact-making region are spaced apart from one another in the direction of the longitudinal axis by a bushing region.

The invention also relates to a measuring element, together with a pressure sensor comprising such a MEMS chip.

BACKGROUND

MEMS chips (micro electromechanical systems) combine electronic elements and micromechanical structures on a semiconductor chip and can process electrical and mechanical information. They are deployed in sensors, actuators and other items.

In the operating state the measuring regions of the MEMS chips of the above-described type are exposed to the pressure space, whereby appropriate measured signals that are recorded in the pressure space can be taken off the contacts. Such MEMS chips are suitable for a pressure-tight arrangement in a bushing, which can be formed by a full peripheral encasement of the surface of the bushing region 11 normal to the longitudinal axis A.

Embodiments of such MEMS chips of known art are, for example, described in WO 2004/081510 A1, or also in the publication of Birkelund K et al: "High pressure silicon sensor with low-cost packaging", SENSORS AND ACTUATORS A, ELSEVIER SEQUOIA S. A., LAUSANNE, SWITZERLAND, Vol. 92, No. 1-3, Pages 16-22. Such MEMS chips have in the measuring region a cavity in the carrier substrate, which is closed by a silicon-on-insulator (SOI) wafer, whereby a measuring bridge is fitted within the cavity on the SOI wafer. Moreover, in the whole of the forward region of the MEMS chip the SOI wafer is configured with a reduced thickness, so that the latter operates there as a membrane.

The stiffness of this membrane, which is responsible for the sensitivity of the MEMS chip, or more particularly the measuring element, is now adjusted via the remaining residual thickness of the SOI wafer in the measuring region. This is relatively costly, since the thickness reduction as a rule is achieved by selective etching of the silicon layer: the longer the etching process, the thinner becomes the membrane layer. However, since these etching times are very short, an accurate reproduction of a specified membrane stiffness becomes extremely difficult.

SUMMARY OF THE INVENTION

The object of the present invention is to describe a MEMS chip, a measuring element and a pressure sensor for the measurement of pressures at a high ambient temperature, in particular one above 200° C., whereby the production of such a MEMS chip is to be simplified, with at the same time, an improvement of the reproduction of specified sensitivities.

This object is achieved by means of a MEMS chip, a measuring element and a pressure sensor in accordance with the features described hereinafter.

In accordance with the invention a MEMS chip includes electromechanical measuring means configured in such a manner that the MEMS substrate has a cavity forming a blind hole, the edge of which forms a membrane in the MEMS substrate, and a measuring bridge comprising piezoresistive elements is arranged on a side of this membrane which faces away from the cavity, whereby the MEMS substrate is bonded to the carrier substrate with the side of the cavity facing the carrier substrate, with the result that the carrier substrate forms a bottom wall of the cavity formed under the membrane.

By means of the size, and therefore the area of the blind hole in the MEMS substrate, which forms the SOI layer, it is thus possible to adjust the stiffness of the membrane accurately. The thickness of the membrane is always the same, since the blind hole extends up to an oxide layer in the MEMS substrate, which acts as an etching boundary.

A further advantage consists in the fact that no cavity needs to be formed in the carrier substrate. Moreover, the conductors can be arranged on the surface of the MEMS substrate, which has proved to be simpler than leading them between the two layers.

Such MEMS chips can easily be produced as wafers, and can be sawn into the individual parts; this leads to chips with rectangular cross-sections, which are simple to manipulate.

Advantageous forms of embodiment are disclosed below in more detail. By means of an inventive MEMS chip a measuring element can be formed, and from that a pressure sensor.

A compact build of the MEMS chip ensues, and of a measuring element formed from the latter, whereby a membrane closing a cavity is used as the electromechanical measuring means. For purposes of determining the prevailing pressure, the mechanical stress induced by the deflection of the membrane is used. For this purpose the membrane can deflect, since it bounds the cavity and does not lie against it. With the pressure measurement by means of the membrane, after forming the measuring element in a measuring region, only a small part of the MEMS chip must be freely exposed to the pressure space and thus to the medium. The stiffness of the membrane is defined by the open surface area of the cavity, onto which the membrane bounds.

Media separation and passivation are considerably simplified. Media separation, with the measuring element installed, takes place in the region of a holding ring, which is part of the measuring element.

Amongst other applications, the inventive measuring element can in particular be deployed for high temperature pressure sensors in car production, in aerospace, for gas turbines, technical processes in the gas and oil supply industry, and in the geothermal sector.

BRIEF DESCRIPTION OF THE DRAWINGS

A preferred example of embodiment of the subject matter of the invention is described in what follows, in conjunction with the accompanying drawings. Here:

FIG. 3b shows a frontal view onto the measuring element in FIG. 3a from the contact-making region, as indicated by the arrow in FIG. 3a;

DESCRIPTION OF EXEMPLARY EMBODIMENTS OF THE INVENTION

Figure 1:
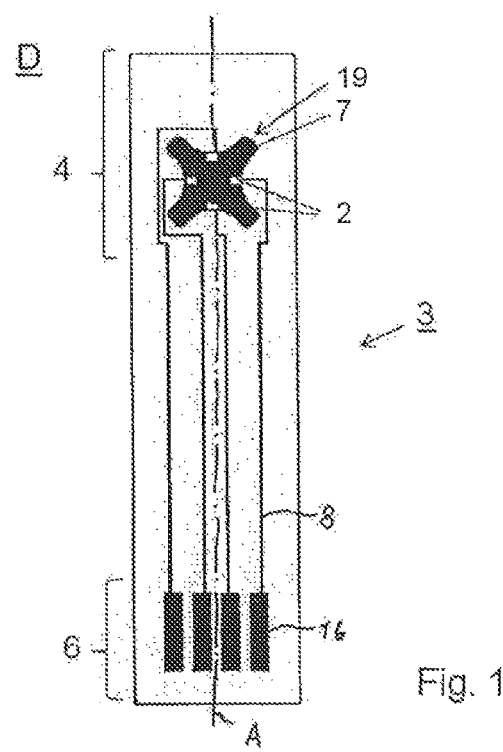
FIG. 1 shows an inventive MEMS chip in a plan view.

A part of the inventive measuring element here presented, for purposes of measuring a pressure at high temperatures, probably in excess of 200° C., is a MEMS chip 3 as represented in FIG. 1, which is essentially configured in the form of a rod that is symmetrically disposed about a longitudinal axis indicated by the chain-dashed line designated A. In the vicinity of a first end the MEMS chip 3 comprises a measuring region 4, and in the vicinity of a second end, a contact-making region 6. Electromechanical measuring means are arranged in the measuring region 4 on a longitudinal surface of the MEMS chip 3. Here these electromechanical measuring means comprise a membrane 7, which is doped with a plurality of piezoresistive elements 2, which are in the form of a measuring bridge 19. From the measuring bridge 19 a plurality of conductors 8 are arranged, running along the longitudinal surface of the MEMS chip 3 from the measuring region 4 to the contact-making region 6. The conductors 8 lead to a multiplicity of contacts 16 in the contact-making region 6. In the operational state the contact-making region 6 lies outside the pressure space D in which the pressure is to be determined.

Figure 2A:
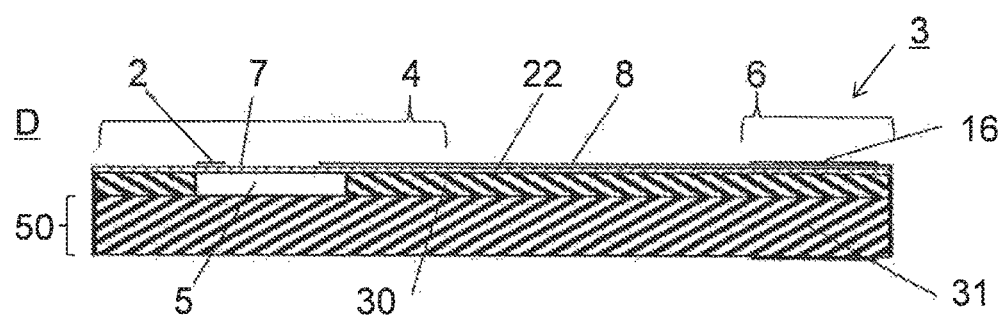
FIG. 2a shows a longitudinal section through an inventive MEMS chip with an evacuated cavity, suitable for the measurement of absolute pressure.
Figure 2B:
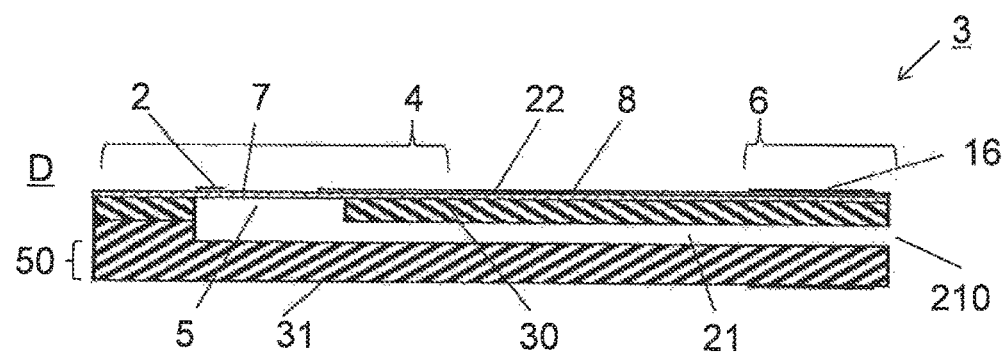
FIG. 2b shows a longitudinal section through another inventive MEMS chip with a channel, suitable for the measurement of relative pressure.
Figure 2C:
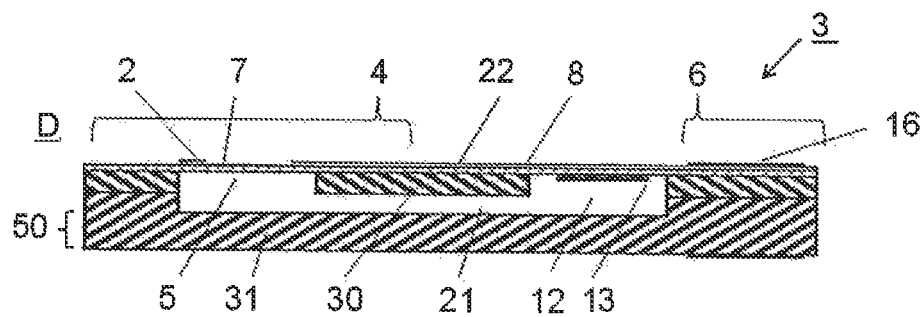
FIG. 2c shows a longitudinal section through another inventive MEMS chip with a channel and a further closed cavity.

In the sectional views along the longitudinal axis A of the MEMS chip 3 in FIGS. 2a to 2c, various forms of embodiment of the MEMS chip 3 are represented. All MEMS chips 3 are in each case formed from a MEMS substrate 30 and a carrier substrate 31. Here the MEMS chip 3 is an SOI-Si-chip, which is formed from the MEMS substrate 30, preferably as an SOI-substrate 30, and the carrier substrate 31 is designed in the form of an Si-carrier substrate 31. However, it is also possible for the carrier substrate 31 to be produced from glass, in particular from a borosilicate glass.

The MEMS substrate 30 and the carrier substrate 31 are arranged bonded to one another in a two-dimensional manner along their longitudinal axis A.

All MEMS chips 3 have a cavity 5 arranged in the measuring region 4, which is formed in the MEMS substrate 30, or is etched out of the latter. The cavity 5, the membrane 7, together with the piezoresistive elements 2, are produced by etching, doping, and/or coating of the substrates 30, 31.

In accordance with the invention, the membrane 7 forms the covering surface of the cavity 5, and thereby closes the cavity 5 in a pressure-tight manner on the side facing away from the substrate 31. The membrane 7 is arranged in a plane running parallel to the longitudinal axis A of the MEMS chip 3. The bottom wall 50 of the cavity 5 is formed by the carrier substrate 31. Since both substrates 30, 31 are permanently connected to one another in a pressure-tight manner, the cavity 5 is closed. The wall thickness of the bottom wall 50 is greater by a multiple than the thickness of the membrane 7. The membrane 7 with the measuring bridge 19 is preferably designed as a thin-film SGI-membrane with piezoresistances 2. This measuring bridge 19 is arranged outside the cavity 5, on the outer surface of the membrane 7, facing away from the substrate 31.

In order to measure absolute pressure a vacuum is formed in the closed cavity 5, as in the MEMS chip 3 in FIG. 2a. In the course of production of the MEMS chip 3 the production space is evacuated for this purpose, and means are provided with which the vacuum can be maintained in the cavity over a long period of time.

In the embodiment of the MEMS chip 3 as in FIG. 2b the cavity 5 is not evacuated, but is provided with a channel 21 running in the direction of the contact-making region 6, which channel, by means of an opening 210, is open to atmospheric conditions. With such a MEMS chip 3 the relative pressure or differential pressure can be measured.

In the embodiment of the MEMS chip 3 as in FIG. 2c the channel 21 terminates in a further closed cavity 12. The latter is preferably arranged in the contact-making region 6, and can be configured to be much larger than the first cavity 5, contrary to its representation. Since in this arrangement the total space subjected to a vacuum is much larger because it includes the first cavity 5, the channel 21 and the further closed cavity 12, the vacuum is more stable than in the embodiments as in FIGS. 2a and 2b, even if gases occasionally diffuse into the first cavity 5. In addition a getter 13 can be arranged in the further cavity 12, in order to maintain the vacuum for as long as possible.

Contrary to its representation in FIG. 2c, the channel 21 can also be arranged in the MEMS substrate 30. In particular, the further cavity 12 and the channel 21 can be arranged, independently of one another as required, either in the MEMS substrate 30, or in the carrier substrate 31. Moreover, the option exists of designing the channel 21, as in FIG. 2b or 2c, such that no bonding material is present between the MEMS substrate 30 and the carrier substrate 31 in this region. Thus a gap is formed, which functions as a channel 21, and terminates, as required, either in a second cavity 12, or as an opening 210 into the environment.

The membrane 7 is always formed from the MEMS substrate 30, as a result of which an open cavity 5, a blind hole, is formed in the MEMS substrate 30. The blind hole in the MEMS substrate 30 is provided on the side of the membrane 7 facing toward the carrier substrate 31, and points away from the carrier substrate 31. The blind hole forming the cavity 5 preferably has steep walls, whereby the walls stand essentially at right angles to the membrane 7. This has the advantage that the size of the cavity 5, can be reproduced more accurately, and the cavity 5 overall requires less space.

In a particularly preferred configuration schematically shown in FIGS. 2a, 2b and 2c, the membrane 7 is bounded towards the cavity 5 by an oxide layer 22. In this case the oxide layer 22 serves as an etching boundary, as a result of which the membrane 7 can always be produced with the same thickness.

As a rule, a further silicon layer is applied adjacent to the oxide layer 22 on the side of the membrane 7 facing away from the cavity 5; this layer 22 extends over the whole MEMS substrate 30. The piezoresistive elements 2 are configured in the latter as resistances in the membrane 7, in particular by doping of the silicon. In order to insulate the resistances 2 from the surrounding silicon, the latter can either be etched away, or the resistances can be insulated from the surrounding silicon by a border made from oxide layers in the form of trenches.

In general it can be seen in FIGS. 2a-2c that in accordance with the invention the electromechanical measuring means are always configured in such a manner that the MEMS substrate 30 has a cavity 5, the floor of which forms a membrane 7 in the MEMS substrate 30, whereby the measuring bridge 19 comprising piezoresistive elements 2 is arranged on the side of this membrane 7 that faces away from the cavity 5. As soon as a pressure is applied onto the membrane 7, the latter bends. The resistances 2 can record this bending by means of alterations in the mechanical stresses and can provide appropriate signals via the conductors 8 to the contacts 16.

Figure 3A:
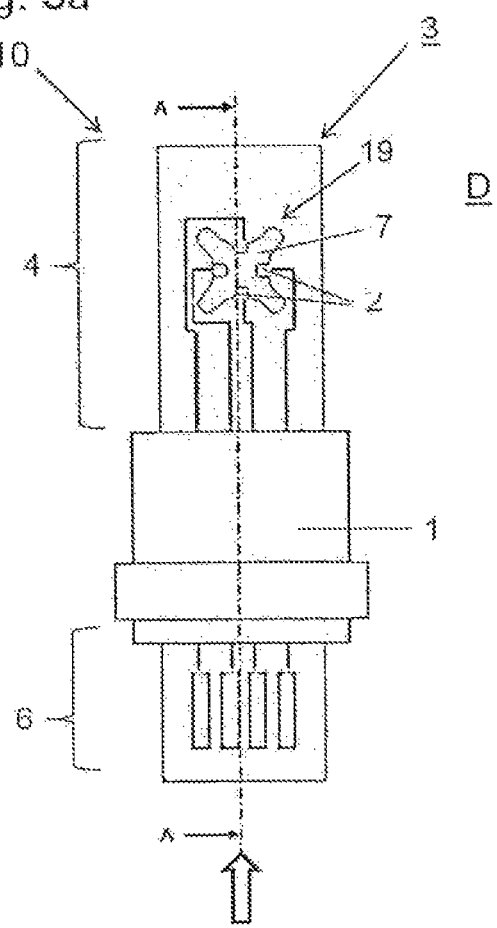
FIG. 3a shows a plan view onto an inventive measuring element with MEMS chip and holding ring

In FIG. 3a is represented an inventive measuring element 10, comprising a MEMS chip 3 with the measuring region 4 and the contact-making region 6, which here is arranged and permanently attached in a pressure-tight manner in a holding ring 1, which is positioned between the two regions 4, 6. The holding ring 1 is embodied in a closed manner, and thereby forms a part of the bushing of the measuring element 10. The MEMS chip 3 is led in the direction of its longitudinal axis A through the holding ring 1, so that a part of the MEMS chip 3 lies within the holding ring 1, that is to say, it is encased by the latter. The measuring region 4 and the contact-making region 6 protrude from the holding ring 1 in different directions, and the holding ring 1 encloses approximately the central region of the MEMS chip 3.

Figure 3B:
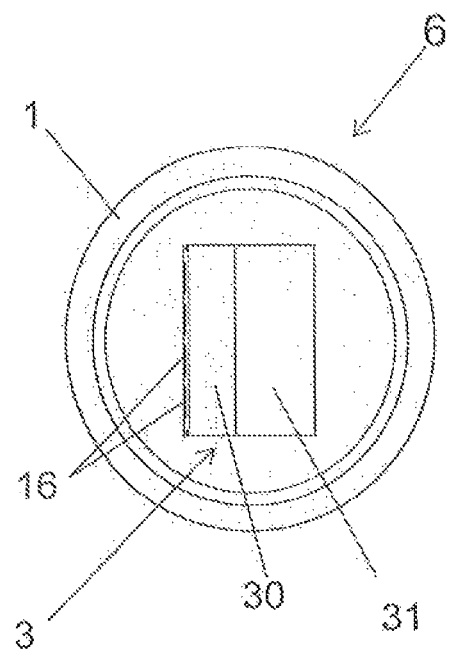

Looking onto the contact-making region 6, with the contacts 16 of the measuring element 10, in FIG. 3b, the holding ring 1 can be discerned; this completely surrounds the MEMS chip 3.

Figure 3C:
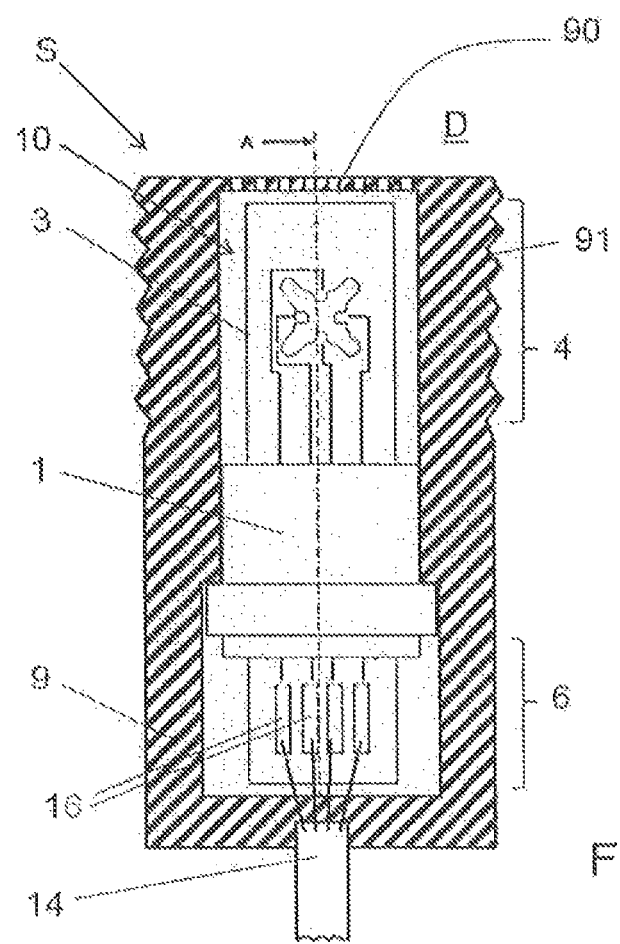
FIG. 3c shows a partial section through an inventive pressure sensor, whereby a housing encloses the inventive measuring element and a connecting cable is laid out of the housing from the contact-making region.

A complete pressure sensor S in accordance with the invention is represented in FIG. 3c. The latter comprises a measuring element 10, comprising the MEMS chip 3 and the holding ring 1, an enclosing housing 9, and cabling 14. The housing 9 extends parallel to the longitudinal axis A of the MEMS chip 3, and serves to protect the measuring element 10. Between the measuring region 4 and the contact-making region 6 the holding ring 1 holds the MEMS chip 3, which it encircles in its periphery. The measuring element 10 is permanently connected with the housing 9, in particular the measuring element 10 on the holding ring 1 is welded to the housing 9 in a pressure-tight manner. For this purpose the holding ring 1 and the housing 9 are preferably embodied in steel. On a front face the housing 9 has at least one housing opening 90, through which the measuring element 10 in the measuring region 4 can be brought into contact with the medium in a pressure space D. A number of housing openings 90 are preferably formed in the front face wall of the housing 9, or the front face wall is designed as a grid or a screen.

Since only the measuring region 4 of the MEMS chip 3 is exposed to the medium in the pressure space D, only the corresponding section of the pressure sensor S is connected with the pressure space D. Here an external thread 91 is provided for purposes of attaching the pressure sensor S, with this thread the pressure sensor S can be screwed into a wall of the pressure space D. In order that the whole pressure sensor S can be screwed in such that it is sealed, sealing means are provided, preferably configured in the form of a front seal, or also behind the thread in the form of a shoulder seal.

Cabling 14 is connected with the contacts 16 on the contact-making region 6 of the measuring element 10, whereby the cabling 14 forms a part of the pressure sensor S. By virtue of the design of the pressure sensor S with the cabling 14, the pressure sensor S can be directly built into an exhaust system of an internal combustion engine, and read-out electronics can easily be connected, outside the pressure space D, and sufficiently spaced apart from the measuring region 4 to avoid any disturbances. Depending upon customer requirements, a pressure sensor S with an encapsulated measuring element 10 and an appropriate means of connection to the housing 9, for example in the form of an external thread 91, can be fully cabled up and ready for connection.

Figure 4A:
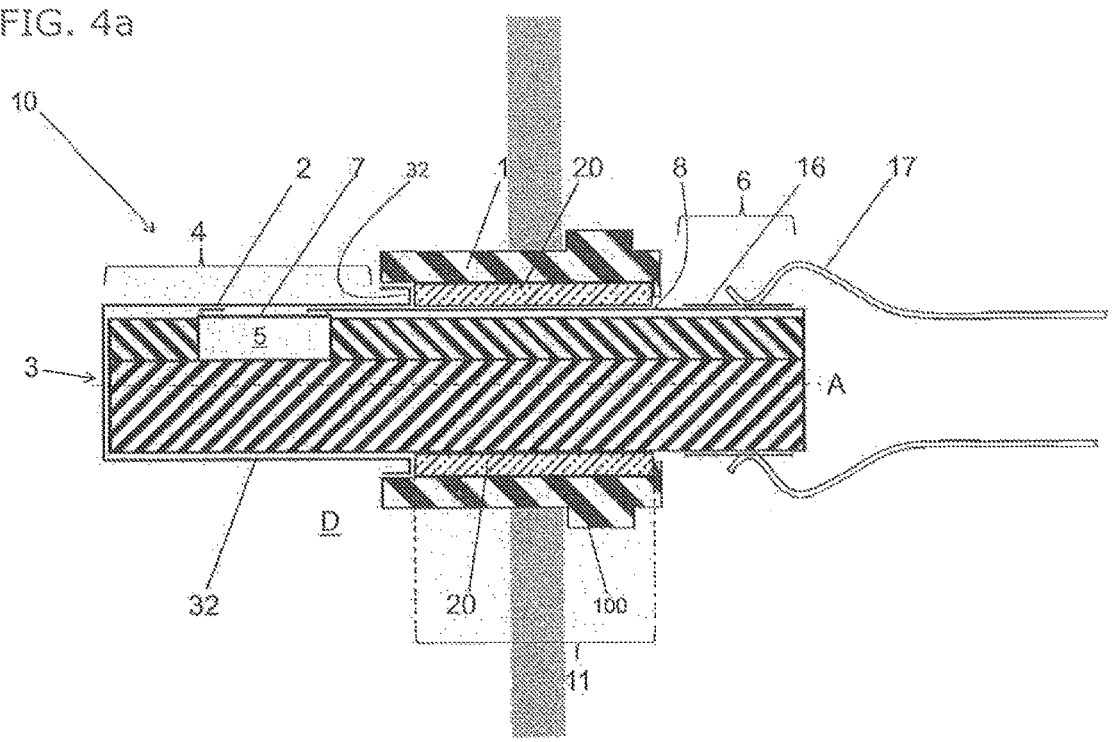
FIG. 4a shows a longitudinal section through an inventive measuring element with a cavity and an attached clamping contact.
Figure 4B:
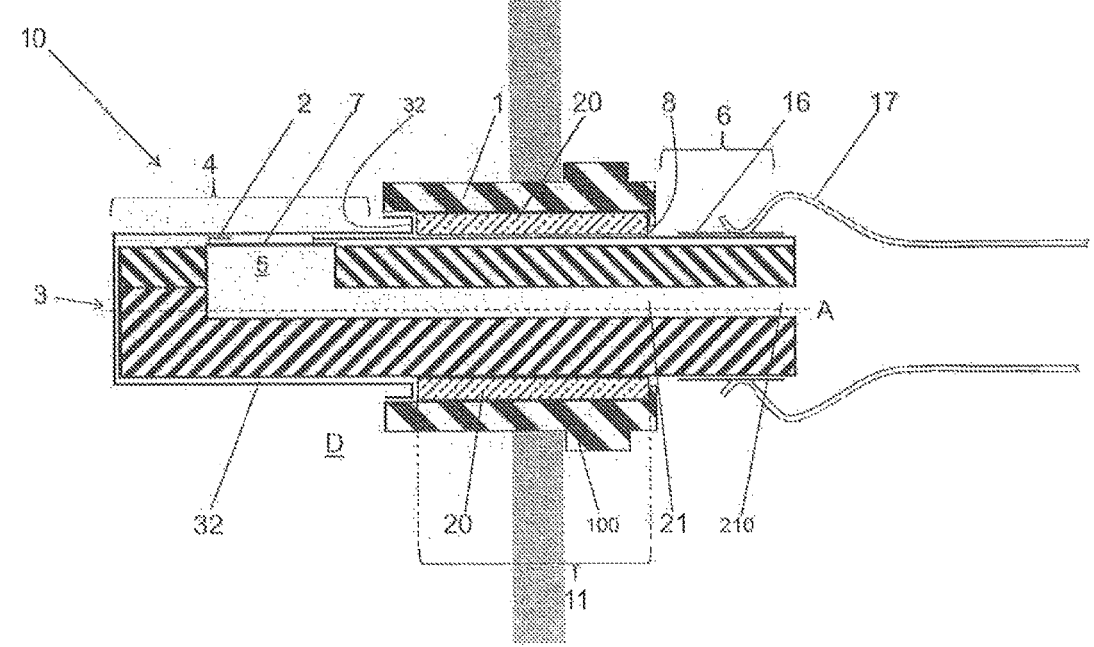
FIG. 4b shows a longitudinal section through an inventive measuring element with a channel adjoining the cavity, together with an attached clamping contact.

FIGS. 4a and 4b serve to illustrate the pressure-tight attachment of the holding ring 1 on the MEMS chip 3. They show respectively a longitudinal section through a measuring element 10 with a MEMS chip 3 and a formed cavity 5, and a longitudinal section through a measuring element 10 with a MEMS chip 3, a formed cavity 5, and an adjacent channel 21. The measuring elements 10 are otherwise identical in construction.

As can be discerned in FIG. 4a, the MEMS chip 3 is cast into a holding ring 1 using a casting compound 20, and is thereby mounted in a mechanically robust manner. The casting compound 20 completely surrounds and seals the MEMS chip 3 along the outer periphery in a bushing region 11. The casting compound 20 permanently connects the MEMS chip 3 with the holding ring 1 in the bushing region 11, whereby the holding ring 1 and the casting compound 20 form a partial encapsulation of the MEMS chip 3. The bushing region 11, and thereby the casting compound 20, are arranged between the measuring region 4 and the contact-making region 6 along the longitudinal axis A. When deployed, the measuring region 4 is located in a pressure space D that is to be measured, while the contact-making region 6, when deployed, is located in an environment at ambient pressure. The pressure space D is separated by a wall, represented in FIGS. 4a-4b by a grey bar, from the environment at ambient pressure. The holding ring 1 and the casting compound 20 thereby form a pressure-tight bushing, whereby instead of disadvantageous attached bonding wires, here the whole body of the MEMS chip 3 passes through the holding ring 1 and is secured with the casting compound 20.

Here the holding ring 1 serves to provide simple manipulation of the measuring element 10, since the measuring element 10 can be introduced into a pressure space D simply by contact with the holding ring 1, without any need to manipulate the measuring region 4. The measuring element 10 can be attached directly onto the wall of the pressure space D in a pressure-tight manner. If a housing 9 is attached onto the holding ring 1, as shown in FIG. 3c, the holding ring 1 can be indirectly attached onto the wall of the pressure space D via the housing 9.

In FIGS. 4a and 4b the holding ring 1 is embodied with a thickened section 100, which serves as a stop when attaching the housing 9 onto the holding ring 1, or when fixing the holding ring 1 directly onto the wall of the pressure space D. The measuring element 10 can be gripped simply and safely on the holding ring 1 and introduced into a hole in the wall of the pressure space D, and there secured on the holding ring 1.

Here the holding ring 1 is configured so as to be only insignificantly longer in the direction of the longitudinal axis A than the bushing region 11, in which the casting compound 20 is located. In other forms of embodiment the holding ring 1 can extend significantly beyond the bushing region 11 in the direction of the measuring region 4, that is to say, it can extend over the whole of the measuring region 4, whereby the MEMS chip 3 is additionally protected.

The casting compound 20 can take the form of an electrically insulating or conducting mass with as small a thermal expansion coefficient as possible, in particular a glass, a ceramic, or an adhesive.

In order to protect the MEMS chip 3 in the measuring region 4, which is exposed to the medium of the pressure space D at high temperatures and high pressures, a passivation layer 32 is arranged here, in particular an atomic layer deposition passivation layer 32. This ALD passivation layer 32 should be applied to sensitive surfaces, which, depending upon the application, can be exposed to an aggressive medium.

Since no delicate bonding wires are arranged on the contact-making region 6, here a clamping contact 17 can simply and easily make contact with the contacts 16 on the atmospheric side of the MEMS chip 3. These clamping contacts 17 can simply lead to cabling, which is not represented here.

While the measuring element 10 in accordance with FIG. 4a can be used for the measurement of absolute pressure, the measuring element 10 in accordance with FIG. 4b, which is of the same design up to the channel 21, can be used for differential pressure measurement.

In order to produce an inventive measuring element 10, a MEMS chip 3, comprising a semiconductor material composite made from a MEMS substrate 30 and a carrier substrate 31, is firstly produced. The contacts 16, the conductors 8, the measuring bridge 19, the piezoresistive elements 2, together with the membrane 7, are to be arranged in the course of substrate production, and the semiconductor substrates, 30, 31 are to be fixed to one another. The MEMS chip 3 is then led through the holding ring 1 in the direction of the longitudinal axis A, and the holding ring 1 is secured by means of the casting compound 20 over the whole of the periphery of the MEMS chip 3 in a pressure-tight manner; here the gap between the surface of the MEMS chip 3 and the inner surface of the holding ring 1 is completely filled, whereby the result is a pressure-tight mounting. Here the casting compound 20 is arranged in the bushing region 11, between the measuring region 4 and the contact-making region 6.

In the FIGS. 1, 3a and 3c here described, any sharpness of the outer edges of the MEMS chip 3 is represented as having been removed. Such an optional configuration of the outer edges of the MEMS chip 3 provides an opportunity for reducing edge stresses, in particular in the region of the holding ring 1.

It is optionally possible to arrange amplification electronics on the MEMS chip 3 at a position at a point on the MEMS chip 3 along the longitudinal direction A. An arrangement in the vicinity of or in the measuring region 4 would be best for optimal signal strength, and freedom from noise and crosstalk, but can only be achieved with appropriate electronic components that can be deployed at high temperatures and pressures. Arrangement of the amplification electronics in the contact-making region 6, and thus outside the pressure space D, is the more cost-effective alternative.

Such amplification electronics can be variously configured and comprise essentially an amplifier, located as near as possible to the site of the piezoresistive elements 2, which executes an amplification of the signals received. In addition to signal amplification, noise suppression, or further processing of the measured signals is also possible. An additional analogue-digital converter enables the generation of digital signals.

REFERENCE LIST

S Pressure sensor
10 Measuring element
1 Holding ring
100 Thickened section
2 Piezoresistive elements
3 MEMS chip
30 MEMS substrate/SOI substrate
31 Carrier substrate/Si-carrier substrate
32 Passivation layer
4 Measuring region
5 Cavity
50 Bottom wall
6 Contact-making region
7 Membrane
8 Conductor
9 Housing
90 Housing opening
91 External thread
11 Bushing region
12 Further cavity
13 Getter
14 Cabling/sensor cable/outer electrical conductor
16 Contact
17 Clamping contact
19 Measuring bridge
20 Casting compound
21 Channel
210 Opening
A Longitudinal axis
D Pressure space

The invention claimed is:
1. A micro-electro-mechanical system chip (MEMS chip) for measuring a pressure in a pressure space, comprising:
    a MEMS substrate elongating along a longitudinal axis, wherein material removed from the MEMS substrate forms a blind hole with an open end and a bottom opposite the open end, wherein the bottom of the blind hole forms a membrane;
    a carrier substrate elongating along the longitudinal axis and bonded to the MEMS substrate such that the open end of the blind hole faces the carrier substrate and the carrier substrate forms a bottom wall of a cavity defined between the membrane and the carrier substrate;

a measuring bridge that includes piezoresistive elements arranged on a side of the membrane which faces away from the open end of the blind hole; and
conductors connected to the piezoresistive elements and leading away therefrom along the longitudinal axis;
wherein in an operating state the piezoresistive elements on the side of the membrane which faces away from the open end of the blind hole are exposed to the pressure space such that fluctuations of pressure in the pressure space cause the piezoresistive elements to produce measured signals transmitted through the conductors.

2. The MEMS chip according to claim 1, further comprising contacts disposed on the same surface of the MEMS chip that includes the membrane.

3. The MEMS chip according to claim 2, wherein for differential pressure measurements the cavity is extended with formation of a channel, which extends into a region of the MEMS chip that supports the contacts and ends in an opening.

4. The MEMS chip according to claim 3, wherein in the region in which the channel is formed, no bonding material is present between the MEMS substrate and the carrier substrate.

5. The MEMS chip according to claim 1, wherein the thickness of the bottom wall of the cavity is greater than twice the thickness of the membrane.

6. The MEMS chip according to claim 2, wherein the MEMS substrate is an SOI-substrate, and the carrier substrate is an Si-carrier substrate.

7. The MEMS chip according to claim 1, wherein the cavity is extended with formation of a channel, which extends into a region of the MEMS chip that supports the contacts and there terminates in a further closed cavity.

8. The MEMS chip according to claim 7, wherein a getter is arranged in the further closed cavity.

9. The MEMS chip according to claim 1, wherein the blind hole has steep walls, and each of the steep walls stands essentially at a right angle to the membrane.

10. The MEMS chip according to claim 1, wherein the membrane is bounded towards the blind hole by an oxide layer.

11. The MEMS chip according to claim 10, wherein the piezoresistive elements are configured as resistances in the membrane adjacent to the oxide layer.

12. A measuring element comprising:
a MEMS chip according to claim 1, and
a bushing, which is formed by a casting compound and a holding ring, the casting compound being disposed surrounding the bushing region of the MEMS chip, the holding ring enclosing the casting compound.

13. The measuring element according to claim 12, wherein the casting compound is glass, solder, or an adhesive.

14. The measuring element according to claim 12 wherein a passivation layer surrounds the piezoresistive elements.

15. The measuring element according to claim 12 wherein the contacts are connected by clamping with a clamping contact.

16. The measuring element according to claim 12, wherein the holding ring extends along the longitudinal axis and protrudes beyond the casting compound in the direction of the measuring region.

17. A micro-electro-mechanical system chip (MEMS chip) for measuring a pressure in a pressure space, comprising:

a MEMS substrate,
a carrier substrate bonded to the MEMS substrate in a two-dimensional manner along their longitudinal axis in the form of a rod,
a measuring region with electromechanical measuring means,
a contact-making region with contacts connected via conductors with the measuring region,
wherein in an operating state the measuring region can be exposed to the pressure space, and measured signals can be taken off the electromechanical measuring means, and the measuring region and the contact-making region are spaced apart from one another in the direction of the longitudinal axis by a bushing region,
wherein the MEMS substrate has a blind hole with an open end and a bottom opposite the open end, the bottom of the blind hole forming a membrane in the MEMS substrate, and the membrane is bounded towards the blind hole by an oxide layer, and
a measuring bridge comprising piezoresistive elements is arranged on a side of this membrane which faces away from the open end of the blind hole, and the piezoresistive elements are configured as resistances in the membrane adjacent to the oxide layer,
wherein the MEMS substrate is bonded to the carrier substrate with the open end of the blind hole facing the carrier substrate, such that the carrier substrate forms a bottom wall of a cavity formed in the MEMS chip under the membrane, and
wherein the resistances are embedded in a silicon layer, which is arranged outside the blind hole adjacent to the oxide layer, wherein in each case an oxide layer insulates the resistance from the silicon layer.

18. A measuring element comprising:
a MEMS substrate,
a carrier substrate, wherein the MEMS substrate and the carrier substrate are bonded to one another in a two-dimensional manner along their longitudinal axis in the form of a rod,
a measuring region with electromechanical measuring means,
a contact-making region with contacts connected via conductors with the measuring region,
wherein in an operating state the measuring region can be exposed to the pressure space, and measured signals can be taken off the electromechanical measuring means, and the measuring region and the contact-making region are spaced apart from one another in the direction of the longitudinal axis by a bushing region,
wherein the MEMS substrate has a blind hole with an open end and a bottom opposite the open end, the bottom of which blind hole forms a membrane in the MEMS substrate, and
a measuring bridge comprising piezoresistive elements is arranged on a side of this membrane which faces away from the open end of the blind hole,
wherein the MEMS substrate is bonded to the carrier substrate with the open end of the blind hole facing the carrier substrate, such that the carrier substrate forms a bottom wall of a cavity formed under the membrane, and
a bushing, which is formed by a casting compound and a holding ring, the casting compound being disposed surrounding the bushing region of the MEMS substrate, the holding ring enclosing the casting compound,
wherein the measuring region and the contact-making region protrude from different sides of the holding ring.

19. A pressure sensor comprising:
a MEMS substrate,
a carrier substrate, wherein the MEMS substrate and the carrier substrate are bonded to one another in a two-dimensional manner along their longitudinal axis in the form of a rod,
a measuring region with electromechanical measuring means,
a contact-making region with contacts connected via conductors with the measuring region,
wherein in an operating state the measuring region can be exposed to the pressure space, and measured signals can be taken off the electromechanical measuring means, and the measuring region and the contact-making region are spaced apart from one another in the direction of the longitudinal axis by a bushing region,
wherein the MEMS substrate has a blind hole with an open end and a bottom opposite the open end, the bottom of which blind hole forms a membrane in the MEMS substrate, and
a measuring bridge comprising piezoresistive elements is arranged on a side of this membrane which faces away from the open end of the blind hole,
wherein the MEMS substrate is bonded to the carrier substrate with the open end of the blind hole facing the carrier substrate, such that the carrier substrate forms a bottom wall of a cavity formed under the membrane, and
a bushing, which is formed by a casting compound and a holding ring, the casting compound being disposed surrounding the bushing region of the MEMS substrate, the holding ring enclosing the casting compound,
wherein a housing is permanently attached in a pressure-tight manner, onto the holding ring.

20. The pressure sensor according to claim 19, wherein an external thread is arranged on the housing for purposes of connecting with a wall of a pressure space.

21. The pressure sensor according to claim 19, wherein the housing extends over the measuring region, and the housing has a front face wall having at least one housing opening, which is configured in an open manner, or configured as a grid, or configured as a screen.

* * * * *